United States Patent [19]
Snow

[11] Patent Number: 6,042,796
[45] Date of Patent: Mar. 28, 2000

[54] PROCESS AND APPARATUS FOR REMOVING CARBONYLS AND MOISTURE FROM A GAS

[75] Inventor: James T. Snow, Nashua, N.H.

[73] Assignee: Millipore Corporation, Bedford, Mass.

[21] Appl. No.: 09/195,365

[22] Filed: Nov. 18, 1998

Related U.S. Application Data

[62] Division of application No. 08/964,934, Nov. 5, 1997.

[51] Int. Cl.[7] .............................. B01D 47/00; B01J 8/00; B01J 27/13; C01B 31/00; C01G 1/04
[52] U.S. Cl. .................. 423/210; 423/245.1; 423/415.1; 423/416; 423/417; 502/84; 502/226; 502/227; 502/318; 502/345
[58] Field of Search ................ 423/210, 245.1, 423/415.1, 416, 417; 502/84, 226, 227, 318, 345

[56] References Cited

U.S. PATENT DOCUMENTS

| | | | |
|---|---|---|---|
| 2,464,033 | 3/1949 | Gilliam | 260/448.2 |
| 3,624,165 | 11/1971 | Dehn et al. | 260/643 F |
| 3,993,588 | 11/1976 | Thurkral | 252/429 C |
| 4,608,239 | 8/1986 | Devon | 423/210 |
| 4,609,498 | 9/1986 | Banasiak et al. | 260/410.9 R |
| 4,645,851 | 2/1987 | Prud'Homme | 556/472 |
| 4,684,741 | 8/1987 | Prud'Homme | 556/472 |
| 4,740,361 | 4/1988 | Heyd et al. | 423/210 |
| 4,853,148 | 8/1989 | Tom et al. | 252/194 |
| 4,916,236 | 4/1990 | Kudoh et al. | 548/508 |
| 5,451,384 | 9/1995 | Carr | 423/210 |
| 5,747,407 | 5/1998 | Martin | 502/26 |

FOREIGN PATENT DOCUMENTS

| | | | |
|---|---|---|---|
| 2040232 | 4/1970 | France | C07C 29/00 |
| 07113838 | 4/1995 | Japan | B01D 53/34 |

OTHER PUBLICATIONS

Chemical Abstracts, vol:Gb, 1982, May 17, No. 20, p. 131, Removing Small Residual Quantities of Sulfur Compounds and/or Iron Pentacarbonyl from Gas Mixtures, Dvorak, Ladislav; Macek, Vladimir; Loukota, Jiri; Andrus, Ludvik zech. CS 187,947.

*Primary Examiner*—Steven P. Griffin
*Assistant Examiner*—Cam N. Nguyen
*Attorney, Agent, or Firm*—John Dana Hubbard, Esq.; Timothy J. King, Esq.

[57] ABSTRACT

A process and composition for removing metal carbonyls and moisture from a gas wherein the gas is contacted with a metal oxide, an organometallic oxide or mixtures thereof having a reduction potential greater than about 0.175 volts and a composition capable of removing moisture from the gas.

8 Claims, 3 Drawing Sheets

PROCESS AND APPARATUS FOR REMOVING CARBONYLS AND MOISTURE FROM A GAS

This application is a divisional application of copending application Ser. No. 08/964,934, filed Nov. 5, 1997.

BACKGROUND OF THE INVENTION

1. Field of the Invention

This invention relates to a process and apparatus for removing a metal carbonyl composition and moisture from a gas. More particularly, this invention relates to a process and apparatus for removing from a gas a metal carbonyl composition and moisture present in a gas to be treated, as well as moisture formed during removal of metal carbonyl composition from the gas.

2. Description of Prior Art

At the present time, numerous industries require the use of purified gases in their processes. Even parts per million (ppm) or parts per billion (ppb) levels of contaminants can have deleterious effects on the appearance or performance of certain products. The 1994 Semiconductor Industry Association (SIA) recommendation for semiconductor processing established key impurity level specifications in bulk and specialty gases for 0.25 µm processing of 0.1–1.0 and 1–100 ppb, respectively. The individual metal on silicon wafer specification for the same device geometry was set at $2.5 \times 10^{10}$ atoms/cm$^2$. Because of these requirements and other observed adverse effects of using unpurified gases, the purification of process and purge gases in the microelectronics industry has found widespread acceptance and usage. The ideal purification material would remove the unwanted impurities without generating volatile by-products that would contaminate the gas. Also, the purification material should not be volatile under vacuum or pressurized process flow conditions. It would additionally be desirable for the purification material to chemically convert any toxic impurities into less toxic, nonvolatile by-products. Ideally, the purification material would operate at room temperature and not require electrical power for operation.

Lindley, et al *Solid State Technol.* 1997, 40 (8), 93 describes the enhanced selectivity for dielectric etch when CO is incorporated in the etch chemistry. This selectivity is required for production of semiconductor devices with geometries ≦0.35 µm. Unfortunately, the reaction of CO with certain metals, e.g., iron and nickel, is thermodynamically favored to form volatile metal carbonyls that can deposit on the wafer resulting in undesired metal contamination. This was observed in Cooper, G. *Semiconductor Intl.* 1997, 20 (8), 301 that describes experimental results showing increased levels of metals, e.g., iron, chromium and nickel, contamination on silicon wafers when CO is packaged in steel vs. aluminum gas cylinders. However, there was still observed an increase in nickel contamination using the aluminum cylinder versus the unetched control silicon wafers that was thought to be due to reaction of CO with the nickel in the Hastelloy tubing and nickel gaskets used in the study. Xu, et al *J. Mol. Catal.* 1993, 83, 391 describe the ready formation of iron pentacarbonyl, $Fe(CO)_5$, from the reaction of CO and the stainless steel surface of a FTIR cell. In addition, both $Fe(CO)_5$ and nickel tetracarbonyl $(Ni(CO)_4)$ are very toxic with Threshold Limit values (TLV) of 100 and 50 ppb, respectively.

Golden, et al *Ind. Eng. Chem. Res.* 1991, 30 (3), 502 describe the adsorption of trace levels of $Fe(CO)_5$ and $Ni(CO)_4$ using five commercially available adsorbents, i.e., activated carbon, silica gel, activated alumina, a methanol catalyst and HY zeolite. The activated carbon and zeolite showed the largest adsorption capacities for the carbonyls and were further investigated for carbonyl desorption at elevated temperatures. The desorption of $Fe(CO)_5$ was observed from the zeolite and only a slight amount (<0.1%) from the carbon; however, $Ni(CO)_4$ was completely desorbed from the carbon at elevated temperatures. In addition, the presence of other impurities, e.g., carbon dioxide ($CO_2$), in the gas was shown to reduce the adsorption capacity of the adsorbents towards the metal carbonyls. The removal of these metal carbonyls via physisorptive processes with the concomitant concentration of these toxic impurities within a purifier will result in a safety and health hazard when the time comes to replace the purifier.

U.S. Pat. No. 4,608,239 describes a process for removing $Fe(CO)_5$ from CO containing gases using a scavenger consisting of an alkali metal hydroxide in conjunction with a high boiling hydroxylic solvent. The use of solvents is undesirable because the vapors from these solvents will contaminate the downstream products with carbon and oxygen impurities under vacuum or pressurized flow conditions.

International Patent Application Publication No. WO 94/25142 describes a scavenger of lead oxide, PbO, dispersed upon a support to remove metal carbonyls from a gas. In this application there is some uncertainty as to whether the carbonyls are removed by chemical or physical means. However, from the data, it may be simply by physisorption since black deposits were only observed when the temperatures were >100° C., i.e., decomposition of the carbonyl. Irreversible removal of the toxic carbonyls by chemisorption is desired from a safety standpoint. While PbO has sufficient reduction potential to oxidize iron and nickel carbonyls to their respective salts, the PbO will concomitantly be reduced to lead metal with the generation of moisture impurity as shown below in the case of $Fe(CO)_5$:

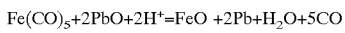

$$Fe(CO)_5 + 2PbO + 2H^+ = FeO + 2Pb + H_2O + 5CO$$

The hydrogen ion is commonly found present in support materials and gases as a contaminant. The release of moisture impurity into the purified gas stream is not desirable since moisture can have deleterious effects in certain manufacturing processes, e.g., semiconductor manufacturing.

Czech. Patent No. CS 187947 B describes a scavenger for $Fe(CO)_5$ and sulfur compounds from gas mixtures consisting of a catalyst having as its principal components, Cu and/or CuO and ZnO. These scavengers have the same undesirable characteristics, i.e., release of moisture impurity, as do the scavengers described in International Patent Application No. WO 94/25142.

U.S. Pat. No. 4,853,148 describes scavengers for removing water impurity consisting in one case of a metal halide compound dispersed in a support having formula MXY, where M is a y-valent metal selected from the group consisting of lithium (I), beryllium (II), magnesium (II), calcium (II), strontium (II), barium (II), cadmium (II), nickel (I), iron (II), iron (III), zinc (II), and aluminum (III); and y is an integer whose value is from one to three. This scavenger has the advantage over other adsorbents, e.g., zeolites and alumina, in that there is no competition for adsorption of moisture with the gas to be purified or other gas impurities, e.g., $CO_2$. The scavenger disclosed by this patent is only capable of removing moisture and not other impurities, e.g., metal carbonyls and sulfur compounds.

It would be desirable to provide a composition suitable for removal of volatile metal carbonyls either alone or together with other impurities such as sulfur compounds from a gas while avoiding release of moisture into the gas. It would additionally be desirable to reduce the moisture concentration of the gas. It would also be desirable that such removal is accomplished by chemisorption and not physisorption mechanisms to prevent reversible release of the sorbed composition. Furthermore, it would be desirable to provide such a composition which is effective for use at normal operating pressure and room temperature.

SUMMARY OF THE INVENTION

The present invention provides a process and apparatus for removing metal carbonyls from a feed gas while avoiding the release of moisture into the gas. In addition, the present invention provides such a process and apparatus which also removes moisture present in the initial feed gas. The apparatus of this invention comprises a housing containing a particulate composition which is an active scavenger for removing metal carbonyls and moisture from a gas. The housing includes an inlet for a feed gas and an outlet for treated gas. The particulate composition is formed of a mixture of particles comprising particles formed from a support coated with a scavenger for metal carbonyls and/or particles of a metal carbonyl scavenger as well as particles formed from a support coated with a scavenger for moisture and/or particles of a moisture scavenger.

Metal carbonyl removal from gas is effected by passing the gas through a bed of the particles under conditions to effect oxidation of the metal carbonyl and release of carbon monoxide derived from the metal carbonyl. Any moisture formed during the oxidation, such as when hydrogen ion is present in the gas or in the apparatus for treating the gas, is retained by the moisture scavenger.

Since hydrogen ion is normally present in most gases, it will readily react even in low concentrations with oxygen atoms produced during the oxidation reaction to form moisture. Thus, the moisture scavenger is positioned either downstream of the scavenger for metal carbonyl or in admixture with the scavenger for metal carbonyls in order to remove moisture formed during the oxidation reaction.

DESCRIPTION OF SPECIFIC EMBODIMENTS

Figure 1:
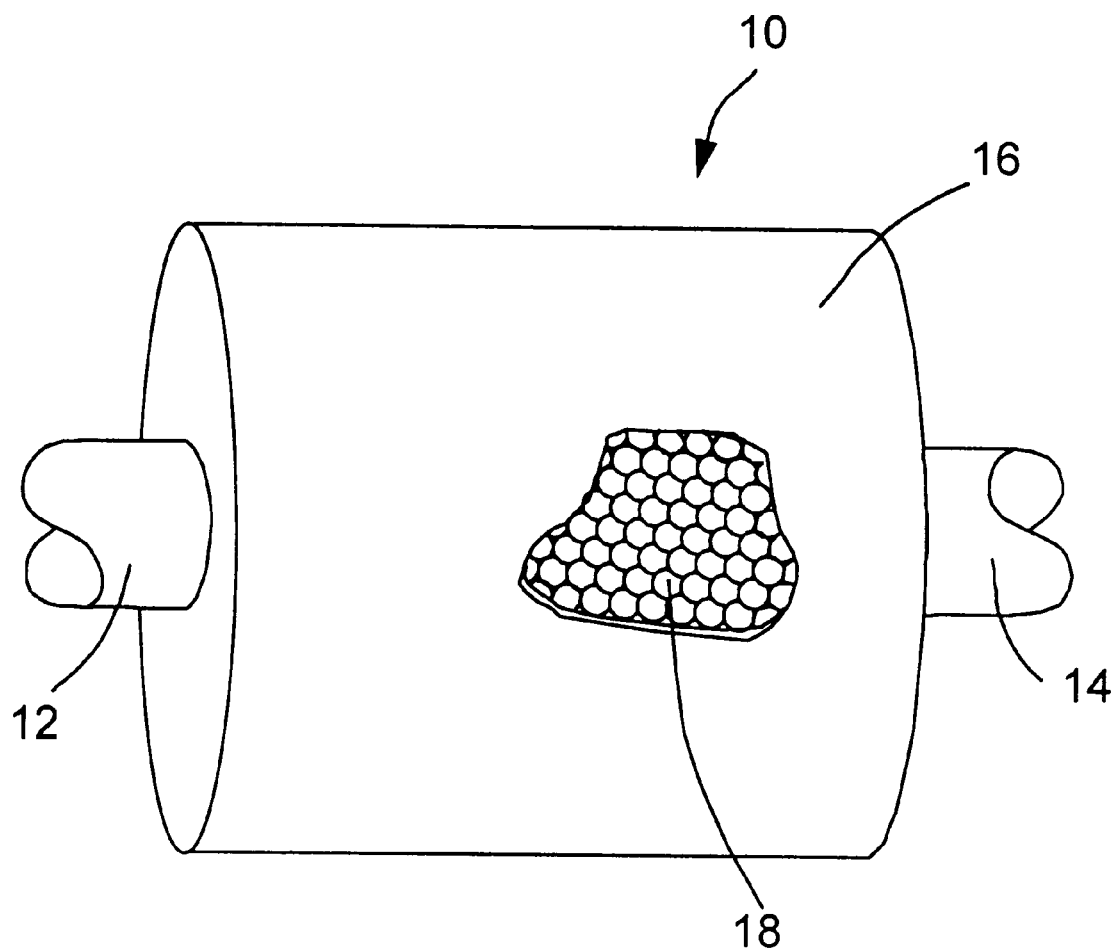
FIG. 1 is a schematic drawing of an apparatus of this invention.

In accordance with the process of this invention, a gas containing a metal carbonyl is contacted with a mixture of particles which include a scavenger for a metal carbonyl and a scavenger for moisture or sequentially with a scavenger for a metal carbonyl followed by contact with a scavenger for moisture.

The scavengers for metal carbonyls according to the present invention consist of:

a) an active scavenger having a reduction potential greater than about 0.175 volts comprising a metal oxide, organometallic oxide or mixtures thereof;

b) an active scavenger for removing moisture from the gas passing through the apparatus of this invention; and c) a high surface area support material that can consist of either (a) and/or (b).

The oxidizing reagents are selected such that the reduction potential is sufficient to effect oxidation of the metal carbonyl compounds. Representative suitable metal oxides include oxides of manganese, chromium, copper, silver, iron, vanadium, titanium, antimony, bismuth, lead, and mixtures thereof or the like. Representative organometallic oxides include species such as pyridinium chlorochromate (PCC), pyridinium dichromate, and chromium (VI) oxide-3,5-dimethoxypyrazole complex or the like. These scavengers also are useful for removing sulfur containing species including $H_2S$, $SO_2$ and $CH_3SH$. The preferred scavengers for metal carbonyls are $CuO$, $Fe_2O_3$, $MnO_2$ or $C_5H_6ClCrNO_3$ (PCC).

The moisture removal capacity or efficiency of the active scavenger for removing moisture is not affected by the presence of other impurities that would preferentially compete with moisture for binding to the support. The active scavenger for removal of moisture impurity either present in the feed gas or generated as a by-product from the reaction of the metal oxide or organometallic oxide species with the metal carbonyl impurity includes species such as anhydrous magnesium halide species on a support.

The active moisture absorber can be:

(i) metal halide compounds dispersed in the support, of the formula $MX_y$;

(ii) metal halide pendant functional groups, of the formula $-MX_{y-1}$, covalently bonded to the support, wherein M is a y-valent metal selected from the group consisting of lithium (I), beryllium (II), magnesium (II), calcium (II), strontium (II), barium (II), cadmium (II), nickel (I), iron (II), iron (III), zinc (II), and aluminum (III) and mixtures thereof;

y is an integer whose value is from 1 to 3; and the activating scavenging moiety metal halide compounds and/or metal halide pendant functional groups have been formed by reaction of corresponding partially or fully alkylated compounds and/or pendant functional groups, with the gaseous hydrogen halide, to form the active scavenging moiety metal halide compounds and/or metal halide pendant functional groups;

the vapor pressure of the support is less than 1 ppm;

M is selected such that the heat of formation of its hydrated halide, $Mx_y \cdot (H_2O)_n$ is greater than or equal to 10.1 kilocalories per mole of such hydrated halide compound for each hydrated water molecule, wherein n is the number of water molecules bound to the metal halide in the metal halide hydrate as disclosed in U.S. Pat. No. 4,853,148 which is incorporated herein by reference. Representative alternative moisture scavengers which can be utilized include scavengers such as $BaO$, $MgSO_4$, $CaCl_2$, $CaSO_4$, or the like.

When not employing particles consisting of the metal carbonyl scavenger or the moisture scavenger, a support for the metal carbonyl scavenger or moisture scavenger can be utilized to form the particles.

Suitable support materials according to this invention include any materials that are compatible with the fluid being purified and any by-products produced during the purification reactions. They typically have the characteristics of:

a) high surface area, generally greater than 50 $m^2/g$;

b) high porosity; and c) good thermal stability.

Representative support materials include alumina, silica, carbon, titania, magnesia, zeolites, and highly crosslinked polymers. The preferred support material is alumina.

The active chemistries utilized in the scavengers of this invention may be deposited on the same or different high surface area support materials. The support material itself may function as one of the active chemistries. In the case of utilizing different support materials for the active chemistries, the separate materials can exist within the purification vessel as a homogeneous mixture or layered beds.

Representative gases which are purified by removing metal carbonyls and moisture impurities include carbon monoxide and inert gases such as argon, helium, nitrogen or the like. Any other gases can be treated provided they are compatible with the described scavengers.

FIG. 1 illustrates the use of the present invention. Referring to FIG. 1, an apparatus of this invention 10 includes an inlet 12, an outlet 14 and a housing 16. Particles 18 can comprise a mixture of metal carbonyl scavenger particles and moisture scavenger particles. Alternatively, the metal carbonyl scavenger particles can be positioned adjacent the inlet 12 while the moisture scavenger particles are separately positioned adjacent the outlet 14. In a third alternative, the metal carbonyl scavenger particles can be positioned in a separate housing in an upstream position while the moisture scavenger particles can be positioned in a separate housing downstream of the housing for the metal carbonyl scavenger particles.

The following examples illustrate the present invention and are not intended to limit the same.

EXAMPLE 1

A chromium (VI) oxide on alumina support is prepared according to the following procedure: To a slurry of aluminum oxide (50.0 g) in deionized water (50 mL) is added with overhead mechanical stirring a solution of chromium (VI) oxide (12.0 g) in deionized water (25 mL). The resulting mixture is stirred for one hour, transferred to a round-bottomed flask and concentrated on a rotary evaporator. Additional drying is done at 120° C. under vacuum for four hours.

EXAMPLE 2

A pyridinium chlorochromate on zeolite support is prepared according to the following procedure: To 2 N HCl solution (66 mL) is added at room temperature chromium (VI) oxide (12.0 g) with magnetic stirring. Pyridine (9.2 g) is added dropwise with stirring over ten minutes. The resulting solution is stirred for 15 minutes. NaY zeolite (50.1 g) is added to the solution resulting in a temperature increase of the mixture. The resulting mixture is allowed to stand for 1.5 h, then the mixture is filtered providing orange-colored zeolite. Drying of the PCC/NaY mixture is effected at 130° C. under vacuum for four hours.

EXAMPLE 3

A commercially available copper oxide on alumina scavenger is dried according to the following procedure: A sample of CU-0226 S (50 cc) from Engelhard Corporation contained within a 50-cc stainless steel sample cylinder using metal frits inserted into the compression fittings is dried at 100° C. and 3 slpm flow of purified nitrogen for 16 hours.

EXAMPLE 4

A mixture of copper oxide on alumina and anhydrous magnesium halide on alumina is prepared according to the following procedure: Within a nitrogen-filled glove box a sample of CU-0226 S (ca. 4 cc) prepared in Example 3 is used to partially fill a small sample vessel constructed from a 2.5 inch section of ½-inch OD stainless steel tubing, compression fittings, metal frits in the fitting to contain the scavenger and valves. To this scavenger is added anhydrous magnesium chloride on alumina scavenger (ca. 0.5 cc; Millipore Waferpure® Reactive Micro Matrix for chloride and oxide gases).

EXAMPLE 5

This example demonstrates the use of the chromium (VI) oxide on alumina scavenger for the removal of hydrogen sulfide ($H_2S$) from an inert gas stream. A 4.5-cc sample tube is filled with the $CrO_3$/alumina scavenger prepared in Example 1. A test gas mixture of 950 ppm $H_2S$ in helium is passed through the sample tube initially at a flow rate of 375 sccm which is later increased to 750 sccm. The downstream $H_2S$ concentration is measured using a residual gas analyzer (RGA). After consuming 146.25 L of challenge gas, $H_2S$ breakthrough is detected by the RGA to provide a $H_2S$ capacity for the inorganic scavenger of 31 L $H_2S$/L bed.

EXAMPLE 6

This example demonstrates the use of the pyridinium chlorochromate (PCC) on NaY zeolite scavenger for the removal of $Ni(CO)_4$ from carbon monoxide.

A 50-cc sample cylinder is filled with PCC/NaY zeolite sample prepared in Example 2. The sample cylinder is installed on a gas manifold with an optional by-pass loop around the sample. An unknown concentration of $Ni(CO)_4$ is generated by heating a nickel filter in carbon monoxide to 130° C. to provide the challenge gas mixture. This test gas mixture is either passed through the sample cylinder or optionally by-passed (to provide background level) at a flow rate of 48 sccm. The downstream by-passed and purified CO gas is measured using a FTIR and RGA.

Table 1 shows the observed results with values given in amps and ND is the abbreviation for none detected.

TABLE 1

|  | $^{60}Ni(CO)_4$ | $^{58}Ni(CO)_4$ | $^{60}Ni(CO)_4$ | $^{58}Ni(CO)_4$ | $^{60}Ni(CO)_4$ | $^{58}Ni(CO)_4$ |
| --- | --- | --- | --- | --- | --- | --- |
| m/e | 171 | 169 | 143 | 141 | 115 | 113 |
| By-passed | 0.20E–12 | 0.52E–12 | 0.56E–12 | 1.47E–12 | 0.35E–12 | 0.83E–12 |
| Purified | ND | ND | ND | ND | ND | ND |

Figure 2:
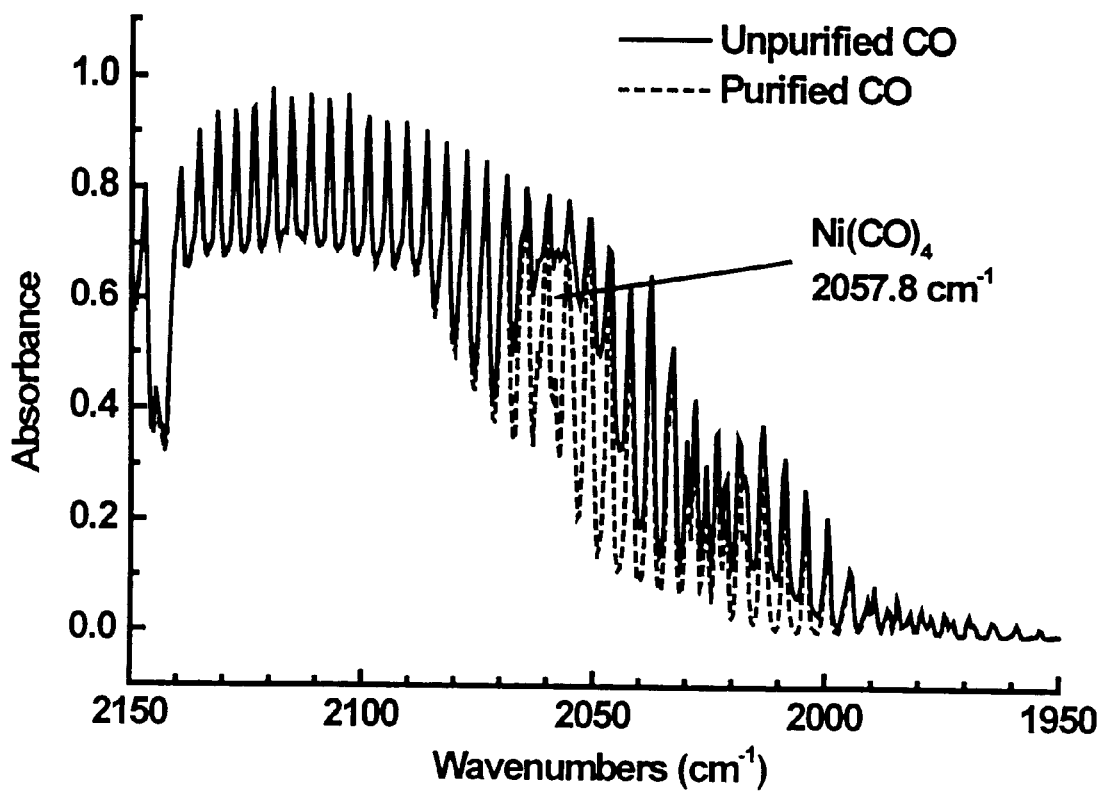
FIG. 2 shows the absorption spectra of CO gas containing nickel carbonyl and of purified CO gas free of nickel carbonyl produced in accordance with this invention.

The overlayed FTIR spectra of by-passed vs. purified CO gas is shown in FIG. 2. As shown in FIG. 2, the purified CO is free of $Ni(CO)_4$ as shown in the dotted trace.

EXAMPLE 7

Figure 3:
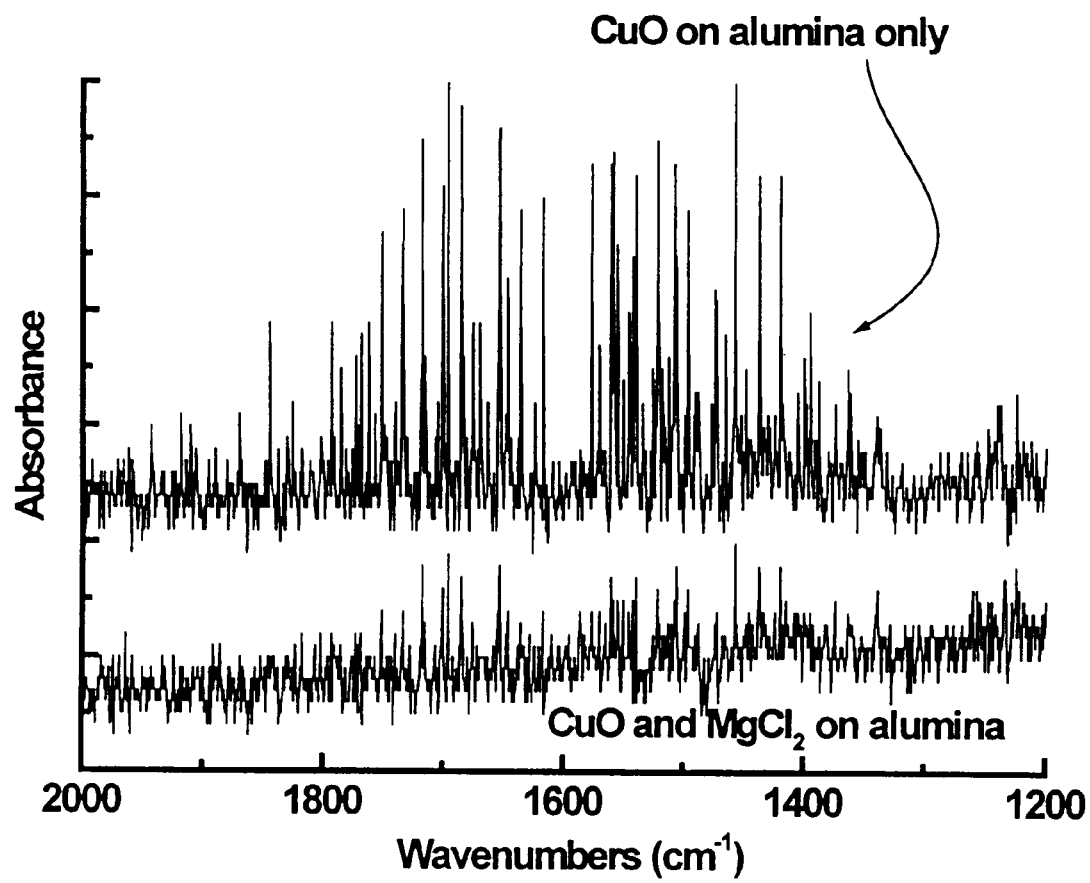
FIG. 3 shows the difference in absorption spectra of CO gas treated to remove iron carbonyl and moisture in accordance with this invention vs. the prior art.

This example demonstrates the difference in downstream moisture impurity level through the use of anhydrous magnesium halide on alumina scavenger with the copper oxide on alumina scavenger in the removal of Fe(CO)$_5$ vs. solely using the copper oxide on alumina scavenger. A 4.5-cc sample tube is filled with copper oxide on the alumina scavenger prepared in Example 3. A sample of Fe(CO)$_5$ is contained in a small section of tubing with valve that is connected to a tee on a manifold upstream of the scavenger sample. The scavenger sample tube is installed on the manifold with an optional by-pass loop around the sample. A ppm-level concentration of Fe(CO)$_5$ in helium is generated by opening the valve to the diffusion tube containing the Fe(CO)$_5$ to provide the challenge gas mixture. This test gas mixture is either passed through the sample cylinder or optionally by-passed (to provide background level) at a flow rate of 100 sccm. The downstream by-passed and purified CO gas is measured using a FTIR. Following this test a 4.5-cc sample tube containing a mixture of copper oxide on alumina and anhydrous magnesium chloride on alumina prepared in Example 4 is tested in a similar fashion on the manifold. The difference in FTIR spectra is shown in FIG. 3. As shown in FIG. 3, the spectrum for the scavenger containing only copper oxide on alumina (the upper spectrum) shows many absorbencies corresponding to the presence of moisture. However, for the spectrum of the mixed purifier containing copper oxide and active moisture scavenger (magnesium halide), the moisture level is near the detection limit of the instrument. This result demonstrates the improved performance of utilizing an active moisture scavenger which forms hydrates upon reaction with moisture as compared to physisorptive dessicants.

What is claimed is:

1. The process for removing metal carbonyls and moisture from a gas, including moisture formed as a result of removal of metal carbonyls from said gas which comprises intimately contacting said gas with a particulate composition suitable for removing a metal carbonyl composition and moisture from a gas as well as for removing a moisture by-product formed during removal of said carbonyl composition from said gas which comprises:

a particulate mixture having a surface area greater than 50 m$^2$/g comprising (a) first particles having a surface formed of a first composition having a reduction potential greater than about 0.175 volts selected from the group consisting of a metal oxide, an organometallic oxide and mixtures thereof and (b) second particles having a surface formed of a second composition capable of removing moisture from said gas, said second composition comprising a metal halide of the formula MX$_y$, wherein X is halogen, M is a y-valent metal wherein said metal halide is formed from a compound of said y-valent metal which is alkylated or which has pendant functional groups reactive with hydrogen halide and wherein a heat of formation of the hydrated metal halide (MX$_y$.(H$_2$O)$_n$) of said metal is greater than or equal to 10.1 kilocalories per mole of hydrated halide for each hydrated water molecule wherein n is the number of water molecules bound to the hydrated metal halide and y is an integer from 1 to 3, and recovering said gas after contacting said particulate composition.

2. The process of claim 1 wherein said first composition is a metal oxide.

3. The process of claim 2 wherein the metal oxide is CuO.

4. The process of claim 1 wherein said first composition is an organometallic oxide.

5. The process for removing metal carbonyls from a gas which comprises contacting said gas sequentially with a first particulate composition having a reduction potential greater than about 0.175 volts selected from the group consisting of a metal oxide, an organometallic oxide and mixtures thereof and then with a second particulate composition having a surface formed of a second composition capable of removing moisture from said gas, said second composition comprising a metal halide of the formula MX$_y$, wherein X is halogen, M is a y-valent metal wherein said metal halide is formed from a compound of said y-valent metal which is alkylated or which has pendant functional groups reactive with hydrogen halide and wherein a heat of formation of the hydrated metal halide (MX$_y$.(H$_2$O)$_n$) of said metal is greater than or equal to 10.1 kilocalories per mole of hydrated halide for each hydrated water molecule wherein n is the number of water molecules bound to the hydrated metal halide and y is an integer from 1 to 3, and recovering said gas.

6. The process of claim 5 wherein said first composition is a metal oxide.

7. The process of claim 6 wherein the metal oxide is CuO.

8. The process of claim 5 wherein said first composition is an organometallic oxide.

* * * * *